UNITED STATES PATENT OFFICE.

DAVID J. PLAYFAIR, OF GLASGOW, SCOTLAND.

PROCESS OF MAKING CYANIDES.

SPECIFICATION forming part of Letters Patent No. 507,753, dated October 31, 1893.

Application filed July 20, 1892. Serial No. 440,577. (No specimens.) Patented in England May 19, 1890, No. 7,764.

*To all whom it may concern:*

Be it known that I, DAVID JAMES PLAYFAIR, a subject of the Queen of Great Britain and Ireland, and a resident of Glasgow, in the county of Lanark, Scotland, have invented certain Improvements in Obtaining Cyanides, (for a part of which improvements I have obtained a British patent, No. 7,764, dated May 19, 1890,) of which the following is a specification.

By my invention I obtain cyanids from sulfocyanates (sometimes termed sulfocyanids or thiocyanates) by means of lead or zinc or a mixture thereof, these metals having a strong affinity for sulfur and forming insoluble sulfids.

In carrying out my invention I cause a sulfocyanate of an alkali or alkaline earth to be mixed with the lead or zinc or mixture thereof and when the mixture is at a suitable temperature, a reaction takes place resulting in the formation of a sulfid or sulfids of the metal or metals and of a cyanid of the alkali or alkaline earth. The necessary heat may be applied in different ways. The materials may be put together into a retort or crucible to which there may be applied externally in the ordinary way sufficient heat to fuse the materials. Ground wood charcoal or other suitable carbon may be mixed with the charge, or may be merely spread over so as to cover the top of the charge, or it may be dispensed with altogether. The carbon is not essential and takes no part in the reaction between the metal and the sulfocyanate, its function being merely to maintain a reducing atmosphere within the retort or crucible, to prevent oxidation of the cyanid formed to cyanate, and to reduce to cyanid any cyanate accidentally formed by access of air to the charge or in consequence of any oxygen compounds of the lead or zinc being present. The lead or zinc may, in a state of fine division produced by granulation or other mechanical means, be thoroughly incorporated with an equivalent weight of the dry alkali sulfocyanate, so as to produce an intimate mixture before being charged into the crucible or retort, or the materials may be put into the retort or crucible in any convenient form and be sufficiently mixed by stirring when they have reached a state of fusion. The charge is heated to a temperature somewhat above the melting point of the lead or zinc employed. When zinc is used the reaction, which proceeds slowly at first, subsequently becomes violent, and stops suddenly on completion; and the charge must then be withdrawn from the retort or crucible or the latter removed from the source of heat. Otherwise, on prolonging the heating, another reaction supervenes, producing undesirable results.

When lead is used the reaction is much less violent; and the fused mass of alkali cyanid and lead sulfid may be allowed to settle, and some of the cyanid be poured off. Some cyanid however remains in contact with the lead sulfid and must be separated from it by lixiviation.

When zinc has been used, no settling of the fused mass is practicable, and the cyanid must be separated by lixiviation after the materials have become cool.

Instead of applying heat to the materials after they have been brought together or mixed, the metal and the alkali cyanate may be fused in separate vessels and be mixed when in the fused state in another vessel heated only moderately or not at all, the object of proceeding in this way being to avoid over-heating and the formation of undesirable products.

When the operation (with joint fusion or separate fusion) has been carefully performed, the resulting solution of alkali cyanid will be found practically free from sulfid. If however any sulfid is present it may be removed by agitating the solution after adding a suitable quantity of freshly precipitated cyanid of lead, which may be formed by adding to a small quantity of the solution a solution of chlorid or other soluble salt of lead. The sulfur will be precipitated as sulfid of lead, which after settling may be separated by decantation and filtering.

The solution of alkali cyanid may be used for many technical purposes without further treatment, or it may be evaporated to dryness, the evaporation being by preference effected in a vacuum pan to avoid decomposition of the cyanid.

The temperature at which the reaction takes place is about 800° to 900° Fahrenheit, but from the heat developed the temperature of the mass rises higher to about 1,000° Fahrenheit.

The novel feature of this invention is in the nature of a discovery that lead or zinc can be used for decomposing sulfo-cyanids by employing either of those metals in a fused state within a range of temperature between the fusing point of sulfo-cyanid of sodium—about 650° Fahrenheit—and the igniting point of the same. The lead or zinc are furthermore found to be available where other metals such as tin and antimony are not, because the sulfids of lead or zinc are insoluble in alkaline solutions.

Cyanids are much used for reducing metallic sulfids and other metallic salts to the metallic state, but that by controlling the temperature, the above-mentioned metals form metallic sulfids along with a free alkaline cyanid is a new discovery.

I claim as my invention—

The process for obtaining cyanids consisting in producing by a heat of from about 800° to 1,000° Fahrenheit a reaction between a sulfocyanate and a metal, fusible at the said temperature, of the class comprising zinc and lead, and thereby obtaining a sulfid insoluble in a solution of the cyanid formed as hereinbefore set forth.

In testimony whereof I have signed my name to this specification in the presence of two subscribing witnesses.

DAVID J. PLAYFAIR.

Witnesses:
 EDMUND HUNT,
 GEORGE PATTERSON.